United States Patent [19]

Chassaing

[11] Patent Number: 4,506,463
[45] Date of Patent: Mar. 26, 1985

[54] PEDAL BLOCK FOR CYCLE SHOES

[75] Inventor: Jacques Chassaing, Neuviller les Saverne, France

[73] Assignee: Adidas Fabrique de Chaussures de Sport, Landersheim, France

[21] Appl. No.: 468,187

[22] Filed: Feb. 22, 1983

[30] Foreign Application Priority Data

Feb. 22, 1982 [FR] France .................. 82 02882

[51] Int. Cl.³ .............................. A43B 5/14
[52] U.S. Cl. .................... 36/131; 74/594.6
[58] Field of Search ......... 36/113, 114, 131, 132; 74/594.6

[56] References Cited

U.S. PATENT DOCUMENTS

| 598,325 | 2/1898 | McIntyre | 74/594.6 |
| 3,964,343 | 6/1976 | Lauterbach | 74/594.6 |
| 4,377,952 | 3/1983 | Gamondes | 36/131 X |
| 4,442,732 | 3/1984 | Okajima | 74/594.6 X |

FOREIGN PATENT DOCUMENTS

| 764839 | 5/1934 | France | 36/131 |
| 2464661 | 3/1981 | France | 36/131 |
| 483403 | 7/1953 | Italy | 36/131 |
| 1685 | of 1893 | United Kingdom | 36/131 |

Primary Examiner—Henry S. Jaudon
Assistant Examiner—Tracy-Gene Graveline
Attorney, Agent, or Firm—Brisebois & Kruger

[57] ABSTRACT

A pedal block device fixed to the sole of a shoe comprising two elongated bars which are preferably identical, each having a transverse groove or recess, and which are transversely spaced one from the other and parallel to the length or longitudinal axis of the shoe, and fastening means cooperating with the sole of the shoe and the bars for separately adjusting, by longitudinal displacement, the position of each bar relative to the sole, and for fixing these positions.

20 Claims, 9 Drawing Figures

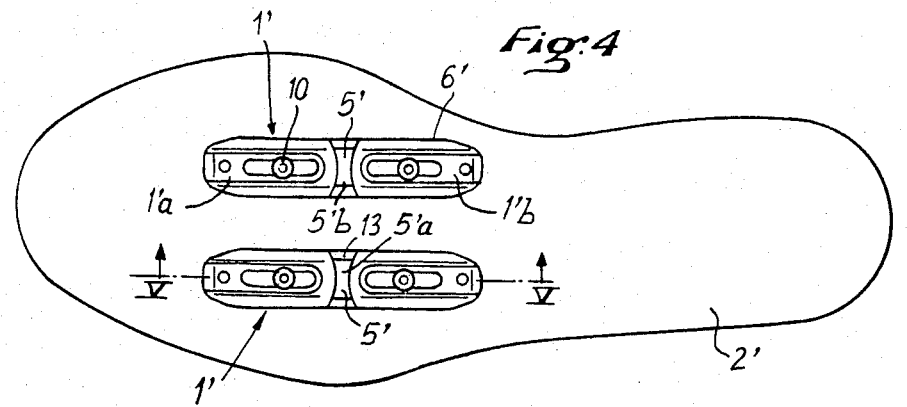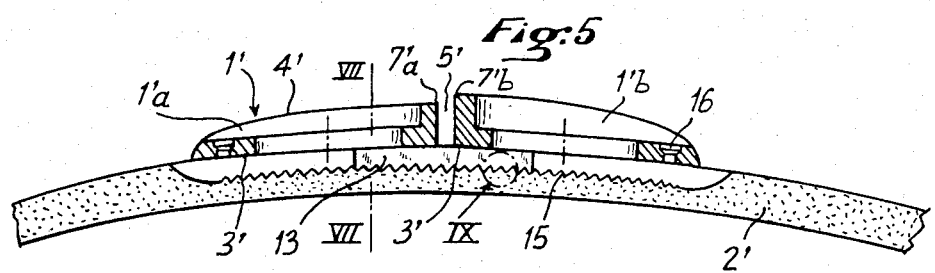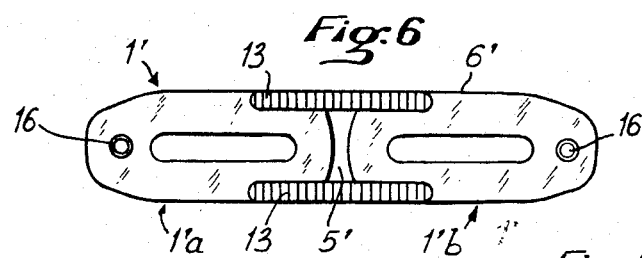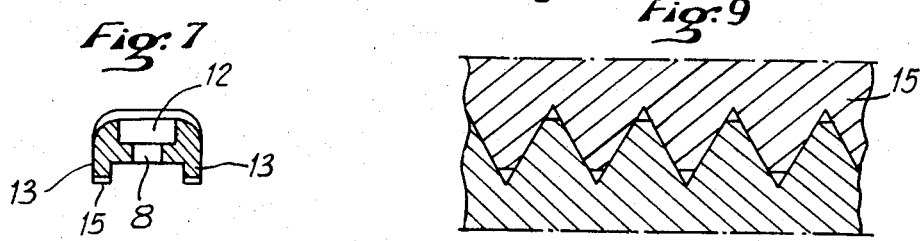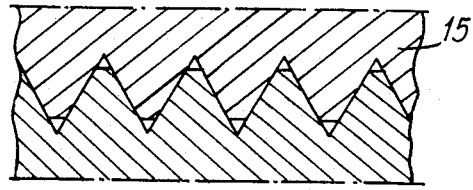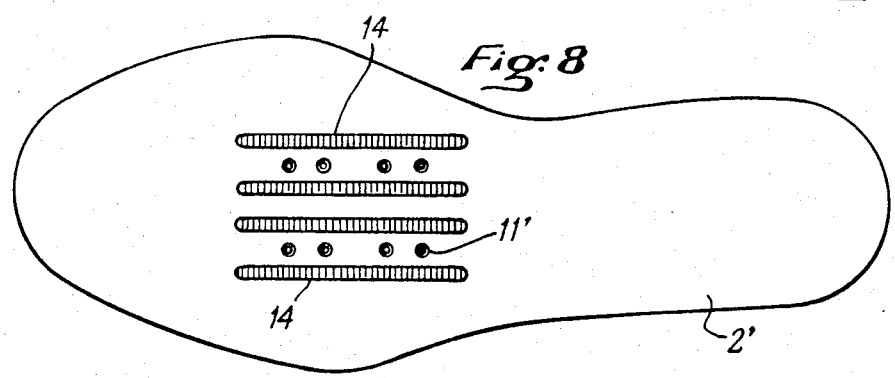

PEDAL BLOCK FOR CYCLE SHOES

The present invention relates to a pedal block arrangement for cycle shoes.

There are currently in use for cycling, particularly competitive road, track or cyclo-cross cycling, devices called pedal chocks or blocks which can be fixed under the sole of the cycle shoe, and which provide for maintaining the shoe in a predetermined position relative to the pedal, during cycling.

One is therefore assured of very regular pedalling.

The known pedal chocks comprise a thin plate, usually of plastic material, on each shoe, which can be fastened, usually by nailing, by means of a large number of tacks or nails, to the bottom face of the shoe sole.

Each of these plates conventionally comprises a locating recess or groove engageable with a rib or blade of the pedal.

Such known devices, although currently used, are not really satisfactory insofar as they are relatively difficult to mount because of the great number of tacks or nails necessary for fastening them to the shoe sole. In addition, once the pedal chock has been mounted, it is not possible to adjust or change the position of the pedal chock without un-nailing and then re-nailing it in a new position.

Pedal block devices are known which include means for permitting changing the longitudinal position as well as the angular position of the pedal block and correspondingly the shoe, with respect to the pedal.

On such arrangement is described, for example, in U.S. application Ser. No. 185,009, filed Sept. 8, 1980 now U.S. Pat. No. 4,377,952 and which corresponds to French application No. 79.22562. The pedal block devices of this type require making and the assembly of a plurality of parts of different structure, with the result that they are complicated to make and are somewhat fragile.

The present invention proposes a pedal block arrangement for cycle shoe which is of simple and economical construction, and which permits changing in a particularly easy manner, at will, the longitudinal position of the cycle shoe with respect to the pedal as well as its angular position.

The pedal block device according to the present invention is essentially characterized by that fact that it comprises, fixed to the sole of the shoe, two elongated bars which are preferably identical, each having a transverse groove or recess, and which are transversely spaced one from the other and parallel to the length or longitudinal axis of the shoe, and fastening means cooperating with the sole of the shoe and the bars for separately adjusting, by longitudinal displacement, the position of each bar relative to the sole, and for fixing in these positions.

In one embodiment each of the bars has at least one longitudinal slot to permit sliding with respect to a pin, stud, or other fastening element such as a threaded screw engageable in a corresponding threading in the sole, and the head of which is accessible from the face of the bar opposite that which engages the sole.

Preferably, each bar according to the invention has two longitudinal elongated slots situated on opposite sides of the transverse recess or groove formed essentially midway of the length of the bar, and in each of which slots are engaged a threaded screw having a head presenting a socket with six faces for engagement by a corresponding wrench or key.

It is to be understood that longitudinally displacing the two bars relative to the sole of the shoe changes the longitudinal position of the shoe with respect to the pedal which engages by its rib or blade in the recess or grooves of the two bars which constitute the pedal block arrangement. When the two bars are aligned transversely their grooves are aligned perpendicular to the longitudinal axes of the bars and thus to the axis of the shoe.

It is further to be understood that one can change the longitudinal position of the two bars relative to each other so that the grooves of the two bars are longitudinally offset with respect to each other, to obtain an angular inclination of the cycle shoe with respect to the pedal. The rib of the pedal in effect engages in the grooves of the two bars of the pedal block which are then not aligned perpendicular to the axis or length of the shoe.

To permit the angular displacement, each groove advantageously has a narrow central portion which enlarges toward the side faces of the bar.

In one particular embodiment of the invention, each of the bars is in the form of two section, separated by the transverse groove, the groove extends between the upper and lower walls of each bar, thus permitting the rib of the pedal engaged in the groove to also come into engagement with the sole of the shoe. The pedal thus rests against the flat width of the sole, offering a large region of support of the foot with a better seating.

Preferably the two sections of each bar are connected by at least one longitudinal rib projecting from the inner wall of each bar, the or each rib seating in a corresponding recess of the sole of the shoe. Each bar preferably has two parallel ribs disposed along its lateral sides, the inner face of each rib comprising teeth which cooperate with corresponding teeth formed in the associated recess of the sole.

In this embodiment it is also possible to set the pedal block as a function of the thickness of the pedal by simple sectioning of the ribs.

To maintain the adjusted position of the pedal block, the bars can advantageously be provided with openings for the passage of securing devices such as screws which can be engaged in the sole.

In one particular embodiment, each of the bars constituting the pedal block according to the invention, presents an outwardly convex wall facilitating walking or running of the user when descended from the bicycle.

Advantageously, the bars constituting the arrangement according to the invention comprise recesses in their exterior walls to receive the heads of the fastening elements so they do not project beyond the exterior convex profile of the wall.

The bars according to the invention can be formed as a single part of appropriate material, particularly metal or plastic, by molding by injection.

Other advantages and characteristics of the invention will become apparent from the following description giving non-limiting examples, with reference to the accompanying drawings, in which.

FIG. 4 is a plan view of a second embodiment of device according to the invention, in position on the bottom of the sole of a cycle shoe, FIG. 5 is a view in section taken along line V—V of FIG. 4, FIG. 6 is a top view of one bar of the device according to FIG. 4, FIG. 7 is a view in section along line VII—VII of FIG. 5, FIG. 8 is a plan view of the sole of a cycle shoe for receiving the device according to FIG. 4, and FIG. 9 is an enlarged view in section of the region IX of FIG. 5.

Figure 1:
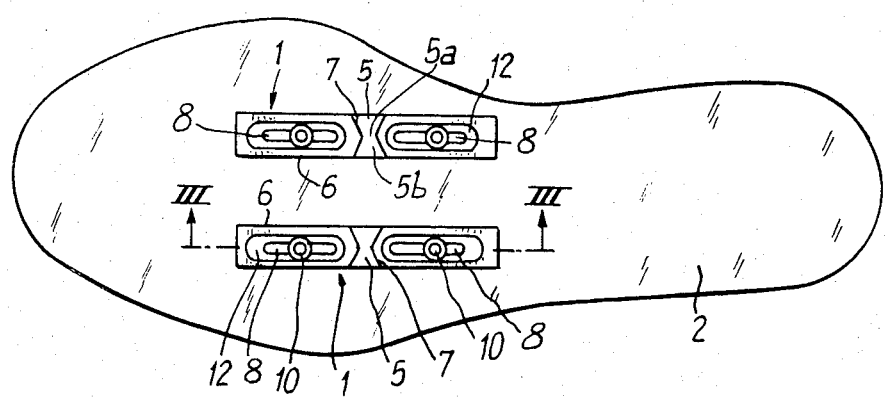
FIG. 1 is a plan view of a device according to the invention, positioned on the sole of a cycle shoe.

As shown at FIG. 1, the pedal block arrangement according to the invention comprises two identical elongated bars 1, fixed to the sole 2 of a cycle shoe.

Figure 2:
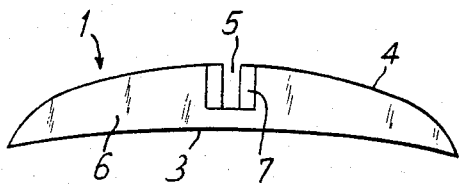
FIG. 2 is a view in elevation of a bar of the device according to the invention.
Figure 3:
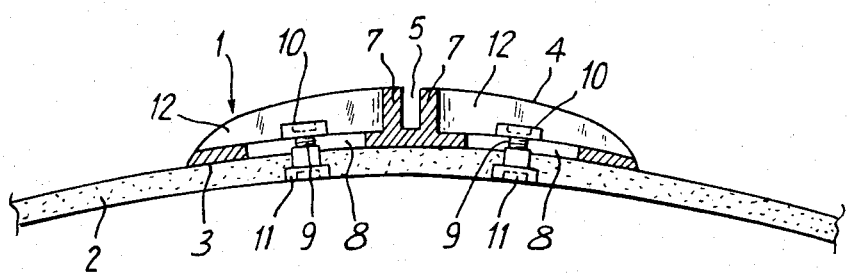
FIG. 3 is a view in section along line III—III of FIG. 1.

As best shown at FIGS. 2 and 3, each of the bars 1 has an inner face 3 of a profile corresponding to the profile of the sole of the shoe on which the bar will be mounted, and an outer face 4 of convex profile, as shown at FIG. 3.

Each bar comprises a transverse groove 5, preferably essentially at the middle of the length of the bar.

As shown at FIG. 1, the groove has a narrow central portion 5a with enlarged sides 5b which diverge toward the outer surfaces of the sidewalls 6.

Each of the grooves 5 is thus defined between two walls 7 each having a V-shaped configuration.

Each bar comprises two elongated longitudinal slots 8 to receive the stem of the threaded bolts 9, whose heads 10 have, for example, a socket having six sides, for engagement by a corresponding wrench or key, and press on the wall of the bar on opposite sides of the slots 8.

The threaded ends of the bolts or screws 9 are threaded into threaded openings in the sole 2, for example, in form of threaded bushings 11 embedded in the sole.

As a variation, the threaded openings can be formed in the body of the sole at the time the sole is fabricated.

The outer wall 4 has aligned with slots 8, recesses 12 for receiving completely therein the heads of the threaded fastening screws so that the heads do not project outwardly beyond the exterior face 4 of a bar, as shown at FIG. 3.

To mount and adjust the pedal block arrangement according to the invention, one proceeds as follows:

Position the two pedal block bars on the sole so that the threaded openings in the sole are aligned with the slots in the bars.

Then, loosely thread the screws 9 in the threaded openings. Then adjust separately or simultaneously, the position of the bars so that the two grooves can receive the blade or rib of the pedal at the desired longitudinal and angular position with respect to the sole of the shoe.

When the desired adjusted positions are obtained, a wrench can be used to tighten the screws to immobilize the two bars.

When the user wants to change the position of adjustment it is simply necessary to loosen the screws of one or both bars whose position is to be changed, and retighten after adjustment to the new position.

The pedal block arrangement shown at FIGS. 4 to 8 has essential characteristics of structure and operation analogous to those of the embodiment of FIGS. 1 to 3.

It is therefore believed sufficient to indicate the differences in structure.

As best shown at FIG. 5, the transverse groove 5' of each elongated bar 1' extends through the outer wall or face 4' with its base at the level of the inner wall or face 3' which has a profile corresponding to that of the bottom of the sole 2'.

As is evident from FIG. 5, the bottom or base of groove 5' is essentially coplanar with the bottom surface of the shoe sole 2'.

It is thus possible to insert the blade of the pedal (not shown) in the grooves 5' of the two bars 1', to a depth to engage the bottom surface of the sole 2'.

As in the embodiment of FIGS. 1-3, each of the grooves 5' has a narrow central portion 5'a enlarged at 5'b to diverge toward the outer surfaces of the sidewalls 6' of each bar.

In this embodiment, each of the grooves 5' is defined by the convex walls 7'a and 7'b, the height of each bar at the rear wall 7'b being greater, in this embodiment than the height of each bar at the front wall 7'a.

In this second embodiment, each bar is constituted of two sections 1'a, 1'b, separated by the groove 5', the two sections being joined from below at the level of inner face 3' by two parallel ribs 13 extending along the sidewalls 6', of each bar and engaging in the grooves or recesses 14 formed in the sole 2'.

The ribs 13 and the grooves 14 have opposed faces with cooperating teeth whose root and peak lines extend transversely relative to the length or axis of the sole.

As shown at FIG. 8, the sole also has threaded openings 11', to receive, as in the embodiment of FIGS. 1 to 3, the threaded screws whose heads 10 are seen at FIG. 4.

In this embodiment, each of the sections of the bars 1' has in addition, an opening 16 to receive a supplemental blocking screw (not shown).

While the invention has been described in connection with particular embodiments, it is well evident that these are wholly non-limiting and the variations and modifications can be made without departing from the scope and spirit of the invention.

I claim:

1. An adjustable pedal block arrangement for a cycle shoe comprising, a first elongated bar having a transverse groove, a second elongated bar having a transverse groove, said bars being positioned on a sole of the shoe with said grooves spaced apart in a direction transverse to the longitudinal axis of the sole, and said bars being mounted generally parallel to the longitudinal axis of the sole for individual longitudinal adjustment to a plurality of different longitudinal positions relative to each other and relative to the sole, and means for securing each bar to the sole in any of said plurality of different positions of longitudinal adjustment.

2. A pedal block arrangement according to claim 1 wherein said first and second bars are identical.

3. A pedal block arrangement according to claim 1 wherein each bar has a longitudinal slot, said means for securing each bar to the sole comprises a fastener engaging the bar and secured to the sole, said fastener having a shank extending through the slot to permit longitudinal sliding of a bar relative to the shank when the fastener is loosened.

4. A pedal block arrangement according to claim 3 wherein said transverse groove is located essentially at the middle of the length of each bar and each bar has a first longitudinal slot on one side of the groove and a second longitudinal slot on the other side of the groove.

5. A pedal block arrangement according to claim 1 wherein each groove extends to the level of an inner surface of its bar, and the groove separates the bar into two sections.

6. A pedal block arrangement according to claim 5 wherein the two sections of each bar are connected together by a rib projecting from said inner surface, said rib of each bar seating in a recess in the sole.

7. A pedal block arrangement according to claim 6 wherein opposed surfaces of each recess and each rib have cooperating teeth.

8. A pedal block arrangement according to claim 3 wherein each fastener comprises a screw threaded into a threaded opening of the sole, said screw having a head, the underside of which engages the bar adjacent said slot, to clamp the bar to the sole when the screw is tightened.

9. A pedal block arrangement according to claim 8 wherein the head of the screw comprises a socket head engageable with a wrench to tighten and loosen the screw.

10. A pedal block arrangement according to claim 1 wherein each of said grooves comprises a narrow central portion which enlarges toward each side of a bar.

11. A pedal block arrangement according to claim 1 wherein each bar has a convex exterior face.

12. A pedal block arrangement according to claim 1 wherein each bar has recesses in an outer face for receiving said securing means therein completely within the confines of said outer face.

13. A pedal block arrangement according to claim 1 wherein each bar comprises a single integral element.

14. A pedal block arrangement according to claim 1 wherein each bar comprises means for seating in a recess of the sole, and the groove of each bar when seated in a recess extends to the surface of the sole.

15. A pedal block arrangement according to claim 14 wherein said means of each bar for seating in a recess comprises a pair of spaced parallel ribs projecting from an inner face of each bar for seating in a pair of parallel recesses in the sole, the inner face of the bar between said ribs seating on the surface of the sole.

16. A pedal block arrangement according to claim 15 wherein a bottom face of each rib comprises a row of teeth, and a bottom face of each recess comprises a row of mating teeth.

17. A cycle shoe comprising an elongated sole, a first pair of parallel rows of teeth on said sole, parallel to the length of the sole, a second pair of parallel rows of teeth on the sole parallel to the length of the sole and beside the first rows of teeth, and fastener connecting means in said sole between the rows of each pair of teeth, each pair of rows of teeth and its fastener connecting means comprising means for securing a bar of a cycle pedal block to the bottom of the sole for longitudinal adjustment relative to the sole.

18. A cycle shoe according to claim 17 wherein said rows of teeth are at the bottom of elongated recesses formed in the sole.

19. A cycle shoe according to claim 18 wherein said sole comprises a one piece molded sole of plastic material.

20. A cycle shoe according to claim 17 wherein said fastener connecting means comprises threaded openings in said sole.

* * * * *